Patented Sept. 26, 1944

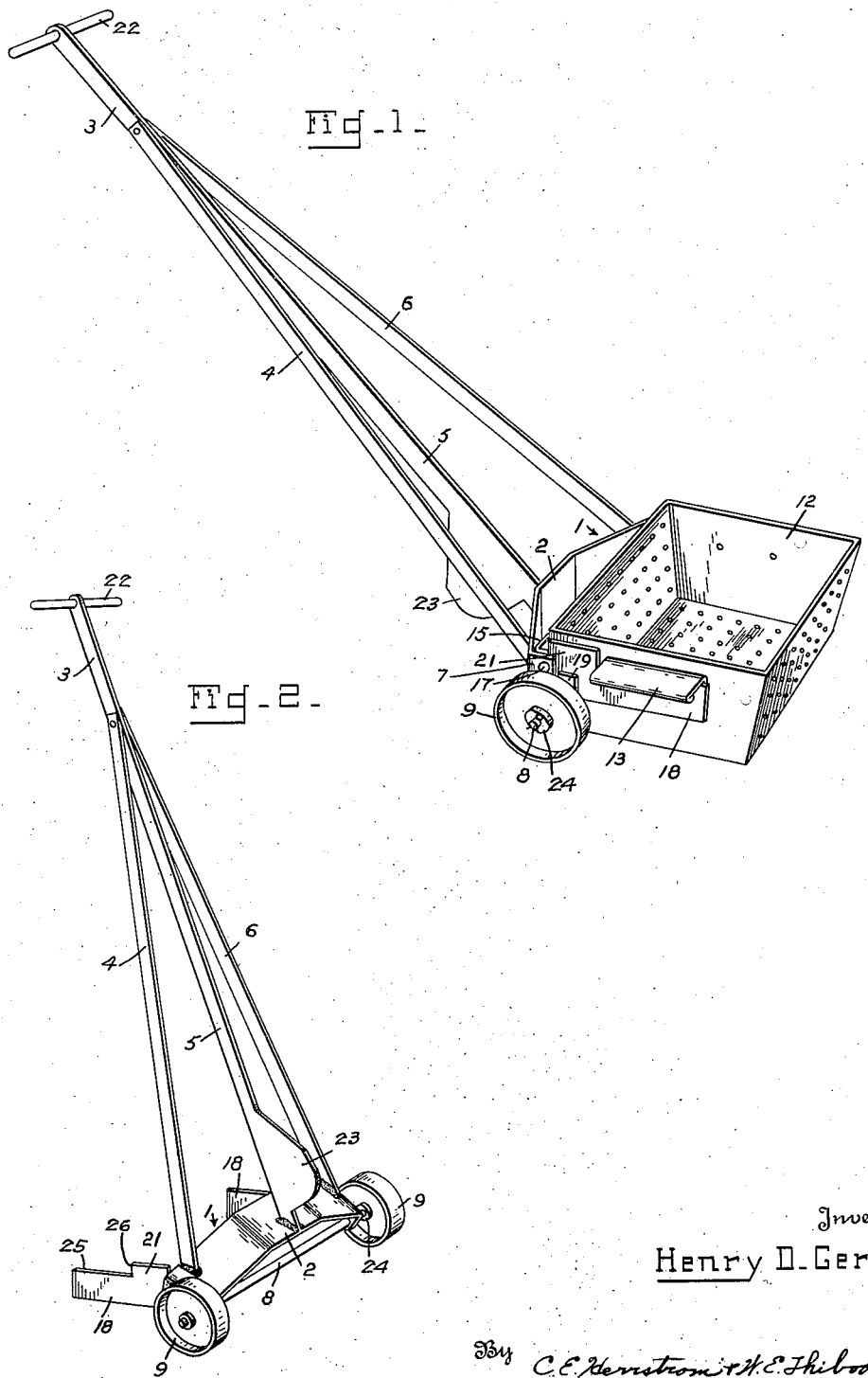

2,358,801

UNITED STATES PATENT OFFICE 2,358,801

TOTE PAN CARRIER

Henry D. Gerdes, Davenport, Iowa

Application July 16, 1943, Serial No. 495,057

2 Claims. (Cl. 214—65.4)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to the art of material handling.

More particularly it relates to a new and improved type of hand truck adapted to be employed for the lifting and transportation of various types of load.

In the normal operation of a production machine shop, that is to say, a factory wherein machinery or machine tools are employed in the manufacture of goods and articles of any desired type, one of the transportation problems involved resides in the carrying of finished products from the machines to the shipping room or point of use. This problem is occasioned by reason of the fact that modern machinery, such as for example automatic screw machines, are capable of producing a large volume of products within a relatively short time. In order to prevent the accumulation of these products to the point where they become too bulky for easy carrying, it is a common practice to provide a rather large number of small containers of a size, which when loaded may be conveniently handled by one man. These devices may conveniently take the form of a carrying tray, or as they are generally called, tote pans. As these pans are filled with the products of machine manufacture they may be lifted and transported from point to point within the shop by one man with relatively little difficulty.

It is accordingly an object of the present invention to provide a hand truck which is especially adapted for the purpose of lifting and transporting material handling trays or tote pans from point to point within a shop.

It is another object of this invention to provide such a hand truck having a plurality of arms or brackets constructed and arranged in such manner as to interfit with the carrying projections of existing tote pans.

Another object of this invention resides in the provision of a hand truck of the type described which may be readily and economically fabricated from existing materials and which will be sufficiently light and yet rugged enough to withstand daily hard shop usage.

Still another important object of the present invention resides in the provision of a hand truck of the type described which may be partially folded in such manner that it may be stood erect and will occupy relatively little space when not actually in use.

Other objects and advantages of the present invention will be apparent as the invention is hereinafter more particularly described with reference to the accompanying drawing in which:

Fig. 1 is an isometric view of a preferred embodiment of a carrying truck according to my invention, showing a tote pan engaged by the arms of the truck in position for transporting; and Fig. 2 is an isometric view of the preferred form of carrying truck in the partially folded or rest position.

Referring more particularly now to Fig. 1 of the drawing, it will be seen that a preferred form of hand truck according to the present invention consists essentially of a base plate or frame generally designated by reference numeral 1 having a generally U-shaped plate 2 which is rigidly connected to a handle 3 by means of a plurality of braces 4, 5, and 6. The braces 4, 5, and 6 may be secured to the frame 2 by any suitable means, such as for example welding, as illustrated in the attached drawing. A crossbar 22 is fitted into the upper extremity of the handle 3 and is secured therein as by welding or any other suitable means. It will thus be seen that the braces 4, 5, and 6, the handle 3 which as illustrated is actually an extension of the brace 5, and the crossbar 22 together constitute a hand grip and lever arm for the application of a lifting or carrying force to the main frame of the truck. In a practical form of construction of this device the handle 3 and brace 5 may preferably consist of a narrow strip of steel plate or single piece of bar steel as aforesaid and the braces 4 and 6 will be suitably secured on opposite sides thereof at a common point as by means of welding or a common through bolt. The central brace member 5 is also provided near its lower end with a projecting portion designated by the numeral 23 for a purpose which will hereinafter become apparent.

The U-shaped frame 2 is turned over at its ends and formed in such manner as to provide generally parallel extending arms 7 which likewise extend downwardly and are suitably bored to receive a through axle 8 at the ends of which are journaled the supporting wheels 9. The axle 8 may preferably consist of a single piece of round bar stock cut to the proper length and provided with transversely drilled holes at each extremity for the reception of a suitable cotter pin or other device for locking the wheels 9 onto the shaft. One or more washers 24 may also be provided for a purpose and in a manner well known in the art.

For the purpose of receiving the load to be carried by the hand truck there is provided a generally U-shaped sub-frame or tote pan receiver 15 nested within the frame 2 and pivotally connected as by means of studs or through bolts 17 to the frame 1 at each side of the latter. This tote pan receiver 15 includes a pair of arms 18 when extend forwardly in a generally parallel direction and are constructed integrally therewith. As best shown in Fig. 2, the arms 18 are provided with a flat cutaway portion generally designated by the numeral 25 and with a shoulder adjacent thereto as indicated by reference numeral 26. A pair of stops 19 are likewise rigidly secured to the arms 18 in such a manner and position as to contact a portion of the arms 7 whereby to limit the downward swinging movement of the arms 18 about the pivot 17.

As shown in Fig. 1, the arms 18 have been moved into engagement with a pair of outwardly extending handles 13 mounted upon a tote pan 12, which constitutes a load to be transported. It will be noted that the sides and bottom of this tote pan 12 have been punched out at intervals to provide an openwork pattern. This has been done in order to allow drainage of the cooling oil or other liquid from the finished machine parts. In practice these tote pans are constructed in standard sizes and are usually entirely uniform in their dimensions. For instance, the tote pan illustrated is of a standard size which may be conveniently handled by a single man when filled to approximate capacity with small machined steel parts. It is thus possible for the machine operator to load one of these tote pans with finished or partially finished parts and then to manually move same to the floor adjacent his machine where it may subsequently be picked up by a hand truck of the type described and transported wherever desired.

In the operation of the device the hand truck is simply maneuvered into a position adjacent the tote pan from which the arms 18 may be slid under the handles 13 of the pan until the inner end of the handle 13 contacts the shoulder 26. The handles 13 are supported upon the flat cutaway portion 25 of the arms 18 which are prevented from rotating downwardly by means of the engagement of the stops 19 with the lower portion of the arms 7. With the parts in the position shown in Fig. 1, it will be apparent that the downward pressure exerted by an operator upon the handle 3 and crossbar 22 will result in raising the tote pan 12 and its load up off of a supporting surface and supporting the same entirely upon the wheels 9. When held in this position the truck may be pushed or pulled in any direction, thus transporting the tote pan wherever desired.

Referring once more to Fig. 2, the lift truck is shown in the partially folded or storage position. In this position the lift truck stands almost vertically and occupies relatively little space. The storage position is reached simply by swinging the handle 3 from the position of Fig. 1 upwardly and through the top dead center position. Before the handle 3 reaches top dead center, the bottom portion of the arms 18 will have contacted the ground or other supporting surface and any further movement of the handle 3 beyond top dead center results in pivoting the arms 18 about the pivot 17 until the top rearward portion of the arms 18 contacts the top portion or upper edge of the plate 2, thus stopping further rotation of the arm 18. It will thus be seen that the arm 18 has a lost motion connection between two extreme positions with the frame 1 and may be stored in one position or operated for load carrying purposes in the other.

The projection 23 provided near the lower portion of the brace 5 is employed for the purpose of temporarily resting the lift truck in a position other than the folded storage position. Referring to Fig. 1, it will be seen that if the tote pan 12 is removed from the arms 18, the handle 3 will swing downwardly to the left about the axle 8 until the projection 23 contacts the supporting surface. In this position the truck will be supported by the two wheels 9 and the projection 23, and the handle 3 and crossbar 22 will be maintained within easy reach and out of contact with the supporting surface.

It will be apparent from the foregoing detailed description that many variations and deviations may be made from the specific embodiment illustrated without departing from the spirit and scope of the present invention. I therefore intend to be limited only in accordance with the following claims.

I claim:

1. A load truck of the type described, comprising a primary frame member of generally U-shaped contour, an operating handle secured to said primary frame and including a plurality of braces likewise secured thereto, a pair of wheels journaled in said primary frame member externally thereof, and a load contacting device comprising a secondary generally U-shaped frame member pivotally mounted in nested relation within said primary member and provided with a pair of outwardly extending arms for contacting a load, said secondary frame member including stops thereon constructed and arranged whereby said arms may be moved between two limiting positions in one of which said arms are operative for carrying purposes and in the other of which said arms are operative for supporting said truck in substantially vertical storage position, said arms having portions thereof cut away whereby to provide a flat load contacting surface extending over a substantial horizontal distance at the top thereof together with a substantially vertical load contacting abutment thereon, the rearward vertical wall of said load contacting abutment constituting the limit stop means for engaging the top edge of said primary frame member when said truck operating handle is swung into the substantially vertical storage position.

2. A load truck of the type described, comprising a primary frame member of generally U-shaped contour, an operating handle secured to said primary frame and including a plurality of braces likewise secured thereto, a pair of wheels journaled in said primary frame member externally thereof, and a load contacting device comprising a secondary generally U-shaped frame member pivotally mounted in nested relation within said primary member and provided with a pair of outwardly extending arms for contacting a load, said secondary frame member including stops thereon constructed and arranged whereby said arms may be moved between two limiting positions in one of which said arms are operative for carrying purposes and in the other of which said arms are operative for supporting said truck in substantially vertical storage position, said arms having portions thereof cut away whereby to provide a flat load contacting surface extending over a substantial horizontal distance at the top thereof together with a substantially vertical load contacting abutment thereon, the rearward vertical wall of said load contacting abutment constituting the limit stop means for engaging the top edge of said primary frame member when said truck operating handle is swung into substantially vertical storage position, said handle portion including an integral generally downwardly extending member located adjacent the lower portion thereof and adapted to be swung into contact with a supporting surface whereby said truck may be entirely supported on said wheels and said projection.

HENRY D. GERDES.